Dec. 25, 1934.  R. GUIMARAES, 2D  1,985,346
VEHICLE BRAKE ARRANGEMENT
Filed Nov. 2, 1932
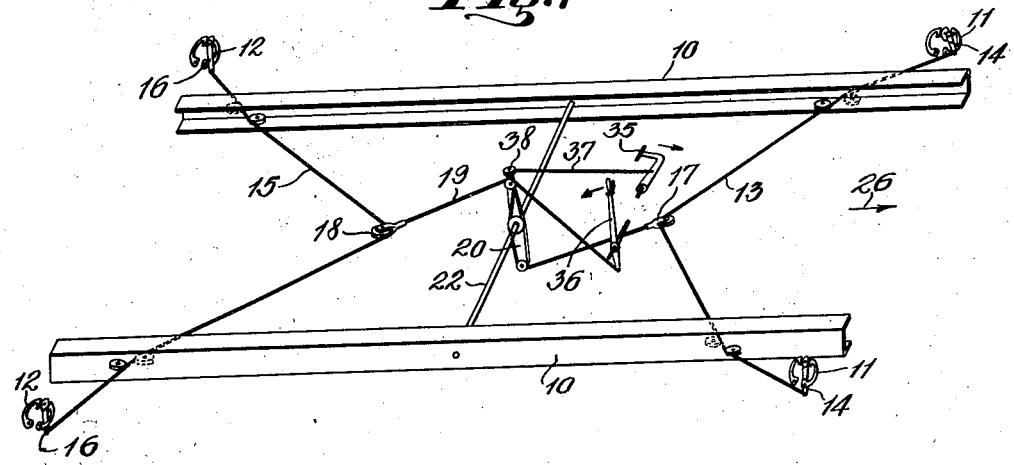
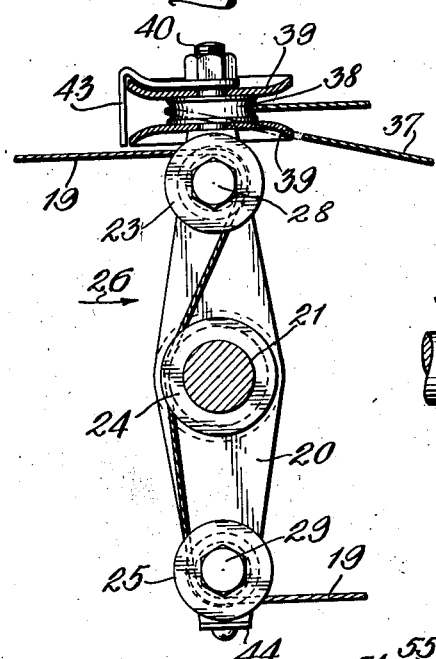
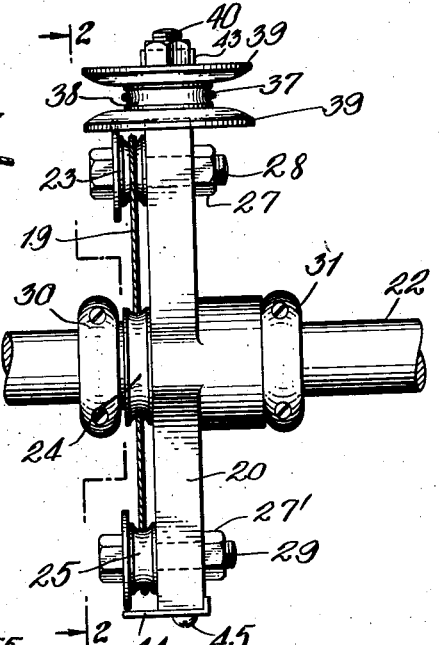
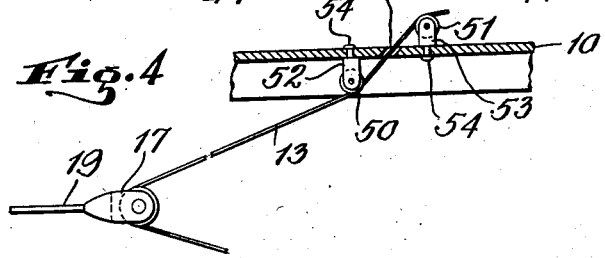
INVENTOR.
RICARDO GUIMARAES, 2nd
BY
ATTORNEY.

Patented Dec. 25, 1934

1,985,346

UNITED STATES PATENT OFFICE 1,985,346

VEHICLE BRAKE ARRANGEMENT

Ricardo Guimaraes, 2d, Sao Paulo, Brazil

Application November 2, 1932, Serial No. 640,881

11 Claims. (Cl. 188—204)

The present invention relates to brake-operating arrangements for vehicles, and particularly relates to a 4-wheel brake-operating arrangement for an automotive vehicle adapted to be operated either by a foot pedal or by a hand lever.

An object of the present invention is to provide a simple brake-operating arrangement for vehicles in which the brakes will automatically adjust themselves upon either manual or foot operation to apply an equal braking torque to the 4 wheels of the vehicle, with the utilization of a simple construction easy to assemble on the vehicle and not readily subject to derangement even under drastic conditions of operation.

Another object is to provide a brake-operating arrangement, particularly adapted for the operation of four wheel brakes, which, though of inexpensive and simple construction, may be readily applied to almost any vehicle, and which will assure equalization of the brake pressure upon the various brakes, regardless of their position in respect to the brake-operating means.

The above and other objects and features of the invention, including various novel combination of parts and desirable particular constructions, will be apparent from the following description of one preferred embodiment shown in the accompanying drawing, in which:

Fig. 1 is a diagrammatic top perspective view of a chassis showing the brake-operating arrangement in position;

Figs. 2 and 3 are, respectively, side and front views upon a large scale of the central compensator, equalizer or pulley lever; and Fig. 4 is a top fragmentary sectional view showing the method of passing the brake-actuating cables or tension members through the side of the vehicle-frame.

In Figure 1 is diagrammatically shown an automobile chassis, but it is to be understood that the braking arrangement may be applied to other types of vehicles.

The chassis-frame is provided with the side channel members 10 and is supported upon springs, axles and wheels (not shown) in the conventional manner. Associated with these wheels are a series of brakes, the front brakes being diagrammatically indicated at 11 and the rear brakes being diagrammatically indicated at 12.

The front brakes 11 are operated by the single continuous cable or tension members 13, which connects with the levers 14 associated with these brakes, while the rear brakes 12 are similarly operated by a single continuous cable or tension member 15, which connects with the lever 16.

The cables 13 and 15, respectively, pass over the horizontal pulleys 17 and 18, which are connected together by another single cable or tension member 19.

Connected so as to swing in a vertical plane on the axis of the chassis-frame is a compensator or equalizing lever 20 (shown in greater detail in Figures 2 and 3). The lever is centrally pivoted at 21 upon a cross-rod 22 on the frame of the vehicle. The lever 20 is of symmetrical shape and upon one of its sides carries the vertical pulleys or grooved wheels or rollers 23, 24 and 25, with parallel axes, over which passes the cable 19. As shown on Fig. 2 the cable 19 passes over the left side of two of the pulleys, and over the right side of the other pulley. In the specific embodiment shown the cable passes over the rear side of the wheels or pulleys 24 and 25, and over the front side of the pulley 23, the direction of the front of the car being indicated by the arrow 26 in Figs. 1 and 2.

As shown, the pulleys 23, 24 and 25 are all positioned substantially in the same plane, so that the cable in passing through the pulley lever 20 will lay substantially in a vertical plane upon or closely adjacent to the axis of the chassis of the vehicle. The pulleys 17 and 18 will also tend to move in this plane.

The nuts 26 and 27 and the bolts 28 and 29 retain the pulleys 23 and 25 in position on the ends of the lever 20, while the lever 20 and the central pulley 25 and maintained in position by the collars 30 and 31 fixed to the cross-rod 28.

In Figure 1 is diagrammatically shown the foot pedal 35 and the hand lever 36, the former customarily being utilized to brake the car while in operation, and the latter being utilized as an emergency brake, or to brake the car when at rest. Connecting these levers is the single cable 37, which passes over the horizontal pulley 38 at the upper end of the lever 20. The pulley 38 is enclosed between the cup-shaped members 39, which are connected by the bolt 40 to the upper end of the said lever 20.

The lower cup-shaped member 39 projects over the pulley 23 and serves to retain the cable 19 in position upon this pulley. The bracket 43 associated with the upper cup-shaped member 39 and the bracket 44 connected at 45 to the lower end of the lever 20, function in a similar manner in respect to the pulleys 38 and 25, respectively.

In Figure 4 is shown the method of connecting the cable 13 through the chassis-frame, the construction here shown also being applicable to the rear cable 15, and to both sides of the vehicle.

The cable 13 preferably extends from the pulley 17 to the brake 11 at an acute inclination to the chassis-frame. When the cable 13 passes through the channel member 10, it is caused to undergo a change of direction so that it will pass through the chassis-frame at an angle between 30 and 60 degrees and approximately 45 degrees. This is accomplished by means of causing the cable to pass over the pulley 50 attached to the interior of the chassis-frame 10 and the pulley attached to the exterior of the chassis-frame. The pulleys 50 and 51 are retained in the retainers 52 and 53 which are riveted, or otherwise connected, to the base of the chassis-frame 54.

In the embodiment specifically shown in Figs. 1 and 4 it will be noted that the inclination of the cable 13 on either side of the pulleys 50 and 51 is substantially the same in respect to the chassis-frame, but that in passing through the chassis-frame through the opening 55 its inclination is changed so that it will pass through said chassis-frame more nearly at right angles thereto. In operation either foot pressure upon the pedal 35 moving said pedal toward the front of the car, or manual operation of the member 36 moving the top of the lever toward the rear of the car, will actuate the cable 37 and the pulley 38 so that the upper end of the lever 20 will be moved forwardly. Upon movement of the lever in this direction the cable 19 will be shortened and the pulleys 18 and 17 will be drawn more closely together. As a result the cables 13 and 15 will be drawn together and the brakes 11 and 12 will be applied.

Upon release of the foot pedal 35 or upon forward motion of the upper end of the emergency lever 36, the upper end of the lever 20 will be permitted to move to the rear, whereupon the effective length of the cable 19 will be increased, the cables 13 and 15 will be permitted to separate, and the brakes 11 and 12 will be released.

Although it is not shown, it is obvious that suitable resilient or other arrangements may be provided in connection with the brakes 11 and 12, the lever 12, the pedal 35 and the lever 36 to return these instrumentalities to their normal position when it is desired to release the brakes. It will be noted that the method of connection to the front brakes is substantially the same as the rear brakes, although the front brakes have a pivotal movement in respect to the chassis-frame in addition to having the usual vertical movement due to the reciprocation of the vehicle-springs during operation of the vehicle. However, by the arrangement shown in Figure 4, and by utilization of the lever of Figs. 2 and 3, these variations are readily taken care of without liability of applying the brakes accidentally during operation, the brakes only being applied upon deliberate manual actuation of the lever 36 or foot actuation of the pedal 35.

The wear on the brake's use may be compensated by shortening as by a turn-buckle or other means (not shown) on the cable of the compensator, or by shortening any of the three cables of the brake mechanism. Instead of cables, chains or steel wires may readily be utilized, it being desirable, however, not to employ tension actuating means which will tend to stretch a great deal under the normal brake-operating loads.

The advantage of the present construction over the constructions now in use upon automotive vehicles resides in its simplicity and adaptability to various types of automobiles. This simplicity and adaptability largely arise because of the utilization of a single cable connecting the foot and hand levers, which pass over the pulley upon the end of the equalizing bar or pulley lever; the construction of the pulley lever or equalizing bar with a single pulley for the cable by which the foot and hand levers are connected and with the other pulleys with parallel axes over which the actuating cable connecting the front and rear brakes passes; and the utilization of a slot in the side of the chassis-frame with pulleys at either side thereof to guide the cables passing to the brake mechanism, preferably at an angle to the chassis-frame greater than that of the remaining portion of the cable.

It will be seen that in the arrangement of the present invention the depression of the pedal 35 or the movement of the lever 36 equalizes the front brakes against the rear brakes so that assurance is had that an equal braking action will be applied to each of the four brakes concerned.

It will be noted in the preferred embodiment that the pulleys, rollers or grooved wheels 17, 18, 23, 24, 25 and 38 are substantially positioned in, and if movable, stay in a vertical plane through the longitudinal axis of the chassis, while the pulleys, rollers or grooved wheels 17, 18, 24, 50 and 51 are substantially positioned in, and if movable, stay in a horizontal plane passing centrally through the chassis side members.

While I have illustrated and described a preferred embodiment of my invention, I do not wish to be understood as limiting myself to the precise mechanism shown except as I may be limited by the appended claims. Obviously, minor changes may be made without departing from the spirit of the invention.

What is claimed is:

1. A vehicle having, in combination, a pair of front brakes, a pair of rear brakes, a pair of continuous cables extending between and arranged to operate each pair of brakes, movable suspended pulleys riding upon each cable, a continuous cable fixedly connected to and extending between said cable pulleys, a pulley lever provided with four rollers, three of said rollers having parallel axes, second-mentioned cable passing over said three rollers, and pedal and lever means for operating the lever to draw the pulleys toward each other to apply all four brakes including a cable connecting said pedal and lever means passing over said fourth roller.

2. A vehicle having, in combination, a pair of front brakes, a pair of rear brakes, a pair of continuous elements arranged to operate each pair of brakes, a pulley engaging each tension element, a continuous cable engaging said pulleys, a pulley lever provided with four rollers, three of said rollers having parallel axes, said second-mentioned cable passing over said three rollers, and the fourth with an axis perpendicular to same horizontal axes, a service pedal, an emergency lever, and a single cable passing over said fourth roller connecting said service pedal and said emergency pedal and operating said pulley lever, whereby upon operation either by the pedal or lever the pulleys are drawn toward each other to apply all four brakes, said pulley lever being provided with retainers to maintain said cables in position upon said rollers.

3. A vehicle having, in combination, two pairs of brakes, two separate connections, each operating one pair of brakes, two driver-controlled brake-applying devices and an equalizing arrangement operated by both brake-applying devices to operate both connections to apply all four brakes with one pair equalized against the other pair, said arrangement including a single cable connecting said devices extending transversely of the vehicle, another cable extending longitudinally of the vehicle and five pulley rollers, three of said rollers being rigidly connected together to move about an axis extending transversely of the vehicle and two rollers movably connected to said connections, the first-mentioned cable passing over one of said three rollers and the second-mentioned cable passing over two of said three rollers and being fixedly connected to the two movable rollers at their axes.

4. A vehicle having, in combination, front and rear pairs of brakes, two separate brake cables, each operating one pair of brakes, a service pedal, an emergency lever, a pulley lever having two pulleys with parallel horizontal axes and a single pulley, the axis of which is perpendicular to axes of said two pulleys, an operating cable passing over said single pulley and connecting said service pedal and said emergency lever, and a connecting cable passing over said two pulleys and connecting said brake cables.

5. A vehicle having, in combination, two pairs of brakes, single cables extending across the vehicle connecting each pair, and another single cable connecting said first-mentioned cables, equalizing connections for applying each pair of brakes and equalizing one of each pair against the other, a service brake pedal and an emergency lever for operating said connections, said connections including a lever provided with a central pivot connection having an axis extending transversely of the vehicle and positioned to rotate in a substantially vertical plane, two pulley rollers attached to one side of said lever, and being respectively positioned at both ends of the lever equidistant from the axis thereof and a third roller positioned at the upper end of the lever with its axis coincident with the longitudinal axis of the lever and transverse to the pivotal axis, the axis of said third roller being parallel to and slightly to one side of the plane of the other two rollers.

6. A vehicle having, in combination, two sets of brakes and a brake-applying connection for each set, a pulley lever arranged to operate both connections having four wheels, three of which have parallel axes and the other of which has a transverse axis, an operating lever and a cable extending from said operating lever to said pulley lever passing over the wheel with the transverse axis.

7. A vehicle having, in combination, two sets of brakes and brake-applying connections for each set, a pulley lever having four wheels arranged to operate said connections, three of said wheels having parallel axes and the other wheel having a transverse axis, an operating lever, a cable extending longitudinally of said vehicle connecting said brake-applying connections, another cable actuated by said lever, said first-mentioned cable passing over three of said wheels and said second-mentioned cable passing over one of said wheels.

8. A vehicle having a chassis with side members and having front and rear brakes, a pedal brake lever, an emergency brake lever, and in combination therewith, four cables, three of which extend transversely of the vehicle, and the other of which extends longitudinally of the vehicle, and fourteen co-operating rollers, each rolling on a single cable, eleven of which are horizontally positioned and three of which are vertically positioned, nine of which have fixed axes, and five of which are movable, three of these movable rollers pivoting about a transverse axis centrally of the vehicle and two moving toward each other longitudinally of the vehicle to apply the brakes and away from each other to release the brakes, each pair of brakes being operatively connected by and provided with one of said transverse cables, said longitudinally movable horizontal rollers engaging intermediate portions of said transverse cables for tensioning the same, and being operatively connected by said longitudinal cable, said side members being provided with slots and said transverse brake-operating cables passing through said slots, and said fixed horizontal rollers being arranged in pairs at either side of said slots to guide the cables therethrough, another transverse cable connecting said pedal and emergency levers and passing over one of said pivotal rollers and said longitudinal cable passing over the other two of said pivotal rollers.

9. A vehicle having, in combination, a pair of front brakes, a pair of rear brakes, a pair of continuous cables extending between and arranged to operate each pair of brakes, movable suspended pulleys riding upon each cable, a continuous cable fixedly connected to and extending between said cable pulleys, a pulley lever provided with a plurality of rollers, said second mentioned cable passing over two of said rollers, and pedal and lever means for operating the lever to draw the pulleys toward each other to apply all four brakes including a cable connecting said pedal and lever means passing over a third roller.

10. A vehicle having, in combination, front and rear pairs of brakes, two separate brake cables, each operating one pair of brakes, a service pedal, an emergency lever, a pulley lever having a group of pulleys and an additional single pulley, an operating cable passing over said single pulley and connecting said service pedal and said emergency lever, and a connecting cable passing over said group of pulleys and connecting said brake cables.

11. A vehicle having in combination, a pair of front brakes, a pair of rear brakes, a pair of continuous cables extending between and arranged to operate each pair of brakes, a movable suspended pulley riding upon each cable, a continuous cable fixedly connected to and extending between said cable pulleys, an equalizing lever pivoted intermediate its ends and provided on one face with two pulleys one adjacent each end thereof and another pulley at an extreme end of the equalizer lever, the latter pulley rotating about an axis different from the axes of the other two pulleys, said second mentioned cable passing over said two pulleys, and pedal and emergency lever means for operating the pivoted lever to draw the pulleys toward each other to apply all four brakes and including a cable connecting said pedal and emergency lever means passing over said pulley at the extreme end of the equalizing lever.

RICARDO GUIMARAES, 2ND.